UNITED STATES PATENT OFFICE.

ALEXANDER SCHWARCMAN, OF BUFFALO, NEW YORK, ASSIGNOR TO KELLOGG PRODUCTS, INC., OF BUFFALO, NEW YORK, A CORPORATION OF NEW YORK.

CATALYST.

1,282,297.

Specification of Letters Patent.

Patented Oct. 22, 1918.

No Drawing.

Application filed May 7, 1918. Serial No. 233,116.

*To all whom it may concern:*

Be it known that I, ALEXANDER SCHWARCMAN, a citizen of the United States, residing at Buffalo, in the county of Erie and State of New York, have invented certain new and useful Improvements in Catalysts, of which the following is a specification.

This invention relates to catalysts and processes of making same; and it comprises as a new catalytic material a native amorphous structureless poreless silica of the class of flint, hornstone or chert, ground to a clay-like fineness, the fineness being advantageously above 300 mesh and still more advantageously 400 mesh or finer, carrying an active hydrogenating catalyst, (usually nickel), said catalyst being best in colloidal form; and it also comprises a method of making such a catalyst wherein such a native structureless amorphous form of silica is fine-ground to a fineness sufficient to give it a clay-like character, is then impregnated with a soluble nickel salt, the nickel precipitated with soda as a hydrate, the soda advantageously containing a nitrogenous colloid, such as wool, in solution to give the precipitated hydrate more of a colloid character, and the material washed, dried and reduced; all as more fully hereinafter set forth and as claimed.

As is well known, vegetable and animal oils may be usefully hardened with hydrogen in the presence of a catalyst. This catalyst is usually nickel, although sometimes palladium and other metals are employed. The nickel is usually employed in conjunction with a carrier. The use of nickel in conjunction with a carrier has the advantage of giving increased active surface and of making a material which is easier to keep in suspension in the oil, to filter out, etc. As a carrier for the nickel very many materials have been proposed. For the most part, porous materials are used in order to obtain a maximum of surface and for other reasons, one being the presumption that it is desirable to have the nickel held mechanically within pores. One common carrier is kieselguhr, the highly porous siliceous skeletons of diatomaceous organisms. I have found, however, that this porous character in a carrier is not necessary; and indeed may be disadvantageous. The nickel within a pore is not as active as the nickel on the exterior of a grain, for the simple reason that the circulation of oil and of gas through the pores of a granule is less active than it is around the surfaces. Furthermore a certain portion of oil within the pores is exposed to the action of the catalyzer longer than the oil outside the grain and is hardened to a greater extent. With a catalyst carried by a porous carrier, hydrogenation is therefore not as uniform as it is where no porous carrier is employed. There is also the difficulty of finally recovering the oil from the fine pores of the exhausted material; this being particularly the case where the carrier, like kieselguhr, is very fine in texture.

A further, and very great objection, to most of the carriers which are now in use is that they are apt to give more or less of an earthy taste to the oil treated. In the case of edible oils, this is a very great disadvantage. Most commercial products made by hydrogenation have a particular taste in a greater or less degree and this taste is usually supposed to result from and to be characteristic of the hydrogenation itself but as a matter of fact, it comes ordinarily from the carrier used with the catalyst. Most of the ordinary materials employed as carriers for nickel will give more or less taste to an oil no matter how thoroughly purified they may be preliminarily. And any very drastic purification of an earthy porous material, such as kieselguhr and the like, reaching all the pores, is hardly practicable commercially.

Whatever the carrier used in making a compound catalyst, however, it must be in such assemblage with or relation to the very fine nickel as to hold it firmly against sliming off. Very fine or colloidal nickel going into suspension in the oil is hard to remove. Hence the desire in the art for what may be called a mechanical holding of the nickel within the pores of a carrier.

I have found that a very desirable type of compound catalyst material having great advantages in oil hardening may be made by using as the carrier certain kinds of structureless and poreless amorphous native silica reduced to an extreme fineness. When so ground they furnish particles which do not pack together in the presence of the oil to form stiff muds but furnish easily pervious cakes which can be readily drained and freed of oil. There are no ultramicroscopic pores, as with earthy materials, to hold oil. The best materials I have as yet found for the present purposes are rocky minerals of the character of those known as flint, hornstone, chert, etc. These amorphous forms of silica break with a conchoidal fracture and all the particles, however far comminution be carried, have this type of surface; a type of surface well adapted for holding nickel and for producing an easily pervious mass, readily drained and handled. A suitable type of flint or hornstone occurs in connection with various deposits of asbestos or chrysotile and forms a waste product of the process of producing asbestos. Flint is a material which does not yield anything of an earthy taste to oil, being in that respect unlike the various earthy materials ordinarily employed, such as kieselguhr and the like. And since the particles are not porous, there is no difficulty in cheaply and economically purifying it, either preparatory to making or to regenerating the catalyst.

It is not a matter of indifference how fine the flint is reduced. I find that it is necessary, in order to prepare an active and efficient compound catalyst, to comminute the flint as fine as 300 mesh, and it is advantageous to comminute it even finer. A fineness of 400 mesh gives a much better compound catalyst. Finenesses as great as 600 mesh are also desirable. I ordinarily employ material ground to about 400 mesh. With such fine grinding as this, the ground flint assumes as a mass something of the physical character of a clay in its relation to liquids; although as the ultimate particles are different in shape it does not give a mud. It does however like clay give colloidal or semi-colloidal suspensions. But unlike clay suspensions these suspensions settle quickly and cleanly.

In manufacturing compound catalysts, it is usual to impregnate the carrier with a solution of a nickel salt, ordinarily the nitrate, and precipitate this solution in the pores with caustic soda, carbonate of soda, etc.; thereafter washing, drying and reducing. The action of the caustic soda is to throw down particles of nickel hydrate in the pores of the porous carrier, these particles being there reduced. The fineness of the particles of nickel hydrate is quite great.

In making the present compound catalyst the same procedure may be followed, although the ultimate particles have no pores within which the nickel solution can be precipitated. Apart from a certain amount of cracking and fissuring, these ultimate particles are impervious and stony in their character. Amorphous silica of the character of flint however has surfaces with a good adsorbing power for many materials, including nickel hydrate and nickel; and with the very fine comminution of the present carrier, the amount of surface is very great. It is the object in producing the present compound catalyst to use a stony carrier with conchoidal surfaces capable of adsorbing and holding firmly the nickel against sliming off, while at the same time producing a material which as a whole stirs up readily with oil and settles cleanly to form a pervious mass or cake.

After producing the necessary fine comminution of the flint, it may be washed with water or an appropriate solvent if this be necessary. Flint is ordinarily so clean and free from taste or odor giving constituents as not to impart taste to even the most "neutral" edible oils. Sometimes with particular grades of flint however it may be advantageous to boil it up with a weak solution of caustic soda. If the grinding machinery leaves much iron in the mass, it may be also advisable to heat it preliminarily with weak hydrochloric or sulfuric acid, the presence of iron being inadvisable in a compound catalyst used for hardening oils. With other types of comminuting apparatus, extraction with acid is not necessary. Most varieties of flint do not ordinarily carry naturally any substantial amount of iron oxid.

In a specific embodiment of the present invention, I may suspend the very finely powdered flint, previously purified if necessary, in a solution of any suitable nickel salt. I prefer nickel nitrate, although nickel sulfate may be used. The amount of nickel salt employed is usually sufficient to give a final product containing about 20 per cent. metallic nickel and 80 per cent. of the pulverized flint. With such a ratio a highly active compound catalyst of very advantageous chemical and mechanical properties can be made. To this mixture of nickel solution and pulverized flint I next add a solution of caustic soda in about the amount sufficient to precipitate the nickel as hydrate with perhaps 5 to 10 per cent. excess. Caustic potash may be used in lieu of caustic soda. After precipitation, the mass may be allowed to settle and the clear liquid decanted off and the precipitate washed by decantation. Or the mass may be drained and washed with water until alkaline reaction in the wash water disappears. Instead of suspending the flint in a body of nickel solution, it may be treated with a little concentrated solution and the moist mass then treated with a concentrated soda solution, and washed. The washed mass is then dried and reduced in hydrogen in the usual manner.

In use the present catalyst stirs up readily into the oil and forms a suspension therewith which may be readily handled in the various types of hydrogenating apparatus now in use, the suspension persisting as long as agitation occurs. Upon allowing the mixture to become quiescent, the compound catalyst settles readily without forming a dense and impervious mud, as is often the case with catalysts using an earthy carrier. The oil containing the compound catalyst can be readily handled in a filter press and the press cakes easily freed of oil. There being no oil carried in pores, removal of oil by the usual methods is quick, clean and complete.

Instead of flint, that is, compact amorphous native silica, other varieties of rocky materials of flinty character may be used. But I find that the best results are obtained with flint, hornstone or chert. I may use quartz ground to a similar fineness; but I do not find it as good as the more amorphous silica of flint. Artificially produced forms of silica do not give me the ultimate stony type of particle I desire, being too earthy in their character. It is a useful expedient in using quartz to give it a preliminary heating to a rather high temperature and to extract it well with caustic soda.

In the described method, the nickel hydrate is precipitated by the caustic soda and is taken up or adsorbed by the surface of the particles of amorphous silica. I find that it makes a more active material if I use a certain proportion of a nitrogenous organic colloid, such as wool, hair, casein, glue, albumen, etc., dissolved in the caustic soda solution used in precipitating the nickel hydrate. The operation of the colloid dissolved in the alkali used for precipitating is apparently to give a more colloidal character to the precipitated nickel hydrate and cause it to be adsorbed in a somewhat different way from ordinary nickel hydrate. Whatever the relation between the nickel hydrate and the surfaces of the carrier produced by the presence of the nitrogenous colloid in the precipitating alkali, it apparently persists after the drying and reduction, that is, the final nickel is in a somewhat different relation to the surfaces of the carrier than nickel precipitated without the use of a colloiding body in solution in the soda. A colloidal nickel produced in this manner is materially more active than ordinary nickel; hydrogenation may be at a somewhat lower temperature and the catalyst retains its activity for a longer period of time.

In using wool in the precipitant, about 2 parts of ordinary wool may be dissolved in a caustic soda solution containing 25 to 30 parts of caustic soda. About 200 parts of water may be used for this amount of soda.

What I claim is:—

1. As a new catalyst for hardening oils, poreless amorphous native silica of a fineness greater than 300 mesh, carrying reduced nickel.

2. As a new catalyst for hardening oils, poreless amorphous native silica of a fineness as high as 400 mesh, carrying reduced nickel.

3. As a new catalyst for hardening oils, finely divided poreless native amorphous silica of the character of that occuring in asbestos deposits, such silica being of a fineness greater than 300 mesh and carrying reduced nickel.

4. As a new catalyst for hardening oils, finely divided poreless native amorphous silica of the character of that occuring in asbestos deposits, such silica being of a fineness as high as 400 mesh and carrying reduced nickel.

In testimony whereof, I affix my signature hereto.

ALEXANDER SCHWARCMAN.